United States Patent Office 3,459,716

Patented Aug. 5, 1969

3,459,716

POLYALKYLENE GLYCOL ESTER-UNSATURATED ACID-METHYLALAMIDE TERPOLYMERS

Paul Schaefer, Riehen, Switzerland, Fritz Mayer, Haltingen, Germany, and Arthur Maeder, Therwil, Switzerland, assignors to Ciba Limited, Basel, Switzerland, a company of Switzerland No Drawing. Filed Apr. 16, 1968, Ser. No. 721,594
Claims priority, application Switzerland, Apr. 24, 1967, 5,831/67
Int. Cl. C08f *15/40*
U.S. Cl. 260—78.5 10 Claims

ABSTRACT OF THE DISCLOSURE

Copolymers containing structural elements of an ester of an alkylpolyethylene glycol and an ethylenically unsaturated polymerisable carboxylic acid, structural elements of an optionally etherified N-methylolamide of an ethylenically unsaturated polymerisable carboxylic acid and structural elements of an ethylenically polymerisable compound which contains at least one acid group. The aqueous solutions and emulsions of these copolymers may be used for the finishing of textiles. In particular these copolymers render textiles hydrophilic, or provide antistatic and antisoiling finishes.

The subject of the present invention are new copolymers containing (a) 80 to 90% of structural elements of an ester of an alkylpolyethylene glycol, whose alkyl residue contains 1 to 3 carbon atoms and whose average molecular weight is 300 to 1000, and an ethylenically unsaturated polymerisable carboxylic acid, (b) 5 to 10% of structural elements of an optionally etherified N-methylolamide of an ethylenically unsaturated polymerisable carboxylic acid and (c) 5 to 10% of structural elements of an ethylenically unsaturated polymerisable compound which contains at least one acid group which confers solubility in water.

As component (a), the copolymers preferably contain structural elements of an ester of a methylpolyethylene glycol, whose average molecular weight is 350 to 750, and of an ethylenically unsaturated polymerisable carboxylic acid. Amongst these esters, esters such as the crotonic acid, itaconic acid, maleic acid and above all the methacrylic acid and acrylic acid esters of methylpolyethylene glycol are of very special interest. In particular, the methacrylic acid-methylpolyethylene glycol ester, whose methylpolyethylene glycol has an average molecular weight of 750, is preferred.

Possible component (b) are primarily structural elements of a N-methylolamide of an ethylenically unsaturated polymerisable carboxylic acid. Suitable materials are for example the N-methylolamides of crotonic acid, itaconic acid, maleic acid and above all methacrylic acid or especially acrylic acid.

As component (c), the copolymers preferably contain structural elements of an ethylenically unsaturated polymerisable carboxylic or sulphonic acid, for example crotonic acid, itaconic acid, maleic acid, styrenesulphonic acid, but especially acrylic acid, methacrylic acid, vinylsulphonic acid, hexahydro-1,3-diacryloyl-5-sulphopropionyl-s-triazine or hexahydro-1-acryloyl-3,5-disulphopropionyl-s-triazine.

The new copolymers are manufactured by polymerising the following with one another, in aqueous solution or emulsion, in the presence of catalysts which yield free radicals: (a) 80 to 90% of an ester of an alkylpolyethylene glycol whose alkyl residue contains 1 to 3 carbon atoms and whose average molecular weight is 300 to 1000, and of an ethylenically unsaturated polymerisable carboxylic acid, (b) 5 to 10% of an optionally etherified N-methylolamide of an ethylenically unsaturated polymerisable carboxylic acid, and (c) 5 to 10% of an ethylenically unsaturated polymerisable compound which contains at least one acid group which confers solubility in water. Depending on the composition of the monomer mixture, polymers which are emulsifiable in water or which are water-soluble are obtained in this polymerisation.

As catalysts which yield free radicals, inorganic peroxides, for example potassium peroxide disulphate, combined with reducing agents, for example sodium metabisulphite, are preferably used.

The polymerisation is appropriately carried out at temperatures of 40 to 80° C., preferably 50 to 60° C.

Emulsion polymerisations are advantageously carried out in the presence of emulsifiers. Anionic emulsifiers such as sulphonates or salts of acid sulphuric acid esters having higher alkyl residues are particularly suitable.

In order to avoid cross-linking by the N-methylol group of the reactive component (b) during the polymerisation, it is appropriate to adjust the pH value of the monomer preparation to 5 to 7.5, preferably 6.5 to 7, for example with ammonia or alkali hydroxides. As a result of this measure the acid component (c) is at least partially neutralised.

The aqueous solutions and emulsions of the copolymers according to the invention may for example be used for the finishing of textiles in concentrations of 4 to 10%, preferably 5%. In particular, these solutions or emulsions serve to render hydrophilic, or provide antistatic and antisoiling finishes on textiles which preferably consist at least partially of synthetic fibres, for example polyesters, polyamide, polyacrylonitrile, polypropylene or polyvinyl alcohol. The textiles are treated with an aqueous copolymer solution or copolymer emulsion in the presence of an acid-yielding reagent, dried, and the copolymers are fixed on to the substrate at temperatures of 130 to 170° C., preferably 150° C.

Possible acid-yielding reagents are for example ammonium chloride, zinc fluoborate, zirconium oxychloride, zinc nitrate, aluminum chloride and above all magnesium chloride.

The textiles may for example be treated by the padding or exhaustion process.

The antistatic finish of the fabrics is wash-resistant and behaves neutral as regards the handle of the fabric, that is to say the handle becomes neither softer nor harder. Furthermore the hydrophilic behaviour is greatly improved compared to untreated textile material. The good anti-soiling finish manifests itself in for example road dust and grease not being retained on washing the finished fabric, and even before washing improved protection against soiling by pigment dirt and contact dirt manifests itself.

Cotton mixed fabrics, for example polyester-cotton mixed fabrics, may be simultaneously given an anti-soiling and crease-resistant finish by combining the present copolymers with, for example, aminoplastic pre-condensates.

In the examples which follow, the parts and percentages are units by weight.

Example 1

44 parts of methacrylic acid-methylpolyethylene glycol ester (molecular weight of the methylpolyethylene glycol=750), 2.5 parts of methacrylic acid and 1 part of sodium laurylsulphonate are dissolved in 135 parts of water. This solution is adjusted to a pH-value of 6.5 to 7.0 by means of 25% strength aqueous ammonia and 3.5 parts of N-methylolacrylamide are added. Half of this solution is mixed at 60° C., whilst stirring and passing in nitrogen, with a solution of 0.25 part of potassium peroxy-disulphate in 5 parts of water and a solution of 0.15 part of sodium metabisulphite in 5 parts of water. After the polymerisation has started the remaining solution of the monomers is mixed with a solution of 0.25 part of potassium peroxy-disulphate in 5 parts of water and is then passed in to the polymerisation vessel over the course of 30 minutes. Simultaneously and separately, a solution of 0.15 part of sodium metabisulphite in 5 parts of water is added dropwise. After completion of the addition, the mixture is allowed to continue to polymerise for 3 hours at 60° C. About 203 parts of an emulsion having a pH-value of 6.5 and a solids content of about 25% are obtained, corresponding to a polymer yield of 97%.

Example 2

41.5 parts of methacrylic acid-methylpolyethylene glycol ester (molecular weight of the methylpolyethylene glycol=750), 2.5 parts of methacrylic acid, 7.3 parts of a 34.5% strength aqueous solution of sodium vinylsulphonate, 3.5 parts of N-methylolacrylamide and 1 part of sodium laurylsulphonate are dissolved in 130 parts of water. The pH-value is 6.5 to 7.0. One-third of this solution is mixed at 60° C., whilst stirring and passing in nitrogen, with a solution of 0.17 part of potassium peroxydisulphate in 3 parts of water and a solution of 0.17 part of sodium metabisulphite in 3 parts of water. After the polymerisation has started the remaining solution of the monomers is mixed with a solution of 0.33 part of potassium peroxy-disulphate in 7 parts of water and introduced into the polymerisation vessel over the course of 45 minutes. Simultaneously but separately, a solution of 0.33 part of sodium metabisulphite in 7 parts of water is added dropwise. After completion of the addition, the mixture is allowed to continue polymerising for 3 hours at 60° C. About 202 parts of a solution having a pH-value of 2.6 and a solids content of about 25% are obtained, corresponding to a polymer yield of 96%.

Example 3

41.5 parts of methacrylic acid-methylpolyethylene glycol ester (molecular weight of the methylpolyethylene glycol=750) and 5 parts of acrylic acid are dissolved in 167 parts of water. This solution is adjusted to a pH-value of 6.5 to 7.0 with 25% strength aqueous ammonia and 3.5 parts of N-methylol-acrylamide are added. One-third of this solution is mixed at 60° C., whilst stirring and passing in nitrogen, with a solution of 0.17 part of potassium peroxydisulphate in 3 parts of water and a solution of 0.17 part of sodium metabisulfite in 3 parts of water. After the polymerisation has started the remaining solution of the monomers is mixed with a solution of 0.23 part of potassium peroxydisulphate in 7 parts of water and introduced into the polymerisation vessel over the course of 45 minutes. Simultaneously but separately a solution of 0.23 part of sodium metabisulphite in 7 parts of water is allowed to run in. After completion of the addition the mixture is allowed to continue polymerising for 3 hours at 60° C. About 238 parts of a solution having a pH-value of 6.5 and a solids content of about 21% are obtained, corresponding to a polymer yield of 98%.

Example 4

40 parts of acrylic acid-methylpolyethylene glycol ester (molecular weight of the methylpolyethylene glycol=750) and 5 parts of acrylic acid are dissolved in 167 parts of water. This solution is adjusted to a pH-value of 6.5 to 7.0 with 25% strength aqueous ammonia and mixed with 5 parts of N-methylolacrylamide. One-third of this solution is mixed at 60° C., whilst stirring and passing in nitrogen, with a solution of 0.17 part of potassium peroxydisulphate in 3 parts of water and a solution of 0.17 part of sodium metabisulphite in 3 parts of water. After the polymerisation has started the remaining solution of the monomers is introduced into the polymerisation vessel over the course of 45 minutes. Simultaneously but separately a solution of 0.23 part of potassium peroxydisulphate in 7 parts of water and a solution of 0.23 part of sodium metabisulphite in 7 parts of water are added dropwise. After completion of the addition, the mixture is allowed to continue polymerising for 3 hours at 60° C. About 238 parts of a solution having a pH-value of 6.5 and a solids content of about 21% are obtained, corresponding to a polymer yield of 98%.

Example 5

A solution of 40 parts of methacrylic acid-methylpolyethylene glycol ester (molecular weight of the methylpolyethylene glycol=750), 5 parts of N-methylolacrylamide and 1 part of sodium laurylsulphonate in 142 parts of water is mixed with a solution of 5 parts of hexahydro-1,3-diacryloyl-5-sulphopropionyl-s-triazine in 25 parts of water and, if necessary, adjusted to a pH-value of 6.5 to 7.0 with 25% strength ammonia. One-third of this solution is mixed at 60° C., whilst stirring and passing in nitrogen, with a solution of 0.17 part of potassium peroxydisulphate in 3 parts of water and a solution of 0.17 part of sodium metabisulphite in 3 parts of water. After the polymerisation has started the remaining solution of the monomers is introduced into the polymerisation vessel over the course of 45 minutes. Simultaneously, a solution of 0.23 part of potassium peroxydisulphate in 7 parts of water on the one hand, and a solution of 0.23 part of potassium metabisulphite in 7 parts of water on the other, are allowed to run in. After completion of the addition the mixture is allowed to continue polymerising for 3 hours at 60° C. The pH-value is readjusted to 6.5 to 7.0 with 25% strength aqueous ammonia if necessary, and about 237 parts of a solution having a solids content of about 21% are obtained, corresponding to a polymer yield of 98%.

Example 6

A solution of 43 parts of methacrylic acid-methylpolyethylene glycol ester (molecular weight of the methylpolyethylene glycol=750), 4.5 parts of N-methylolacrylamide and 1 part of sodium laurylsulphonate in 258 parts of water is mixed with a solution of 2.5 parts of hexahydro-1-acryloyl-3,5-disulphopropionyl-s-triazine in 8.5 parts of water and subjected to polymerisation according to the process described in Example 5. About 330 parts of a solution having a solids content of about 15% are obtained, corresponding to a polymer yield of 97%.

Example 7

43 parts of methacrylic acid-methylpolyethylene glycol ester (molecular weight of the methylpolyethylene glycol=350), 2.5 parts of acrylic acid and 1.25 parts of sodium laurylsulphonate are dissolved in 167 parts of water. This solution is adjusted to pH 6.5 to 7.0 with 25% strength ammonia and mixed with 4.5 parts of N-methylolacrylamide. One-third of this solution is warmed to 60° C. whilst stirring and passing in nitrogen, and is mixed with a solution of 0.16 part of potassium peroxydisulphate in 3.5 parts of water and a solution of 0.4 part of sodium metabisulphite in 10 parts of water. Thereafter the remaining monomer solution and, simultaneously and separately, a solution of 0.34 part of potassium peroxydisulphate in 6.5 parts of water, are introduced into the polymerisation vessel over the course of 45 minutes. After completion of the addition the mixture is allowed to continue polymerising for 3 hours at 60° C.

About 230 parts of a solution having a pH-value of 6.5 and a solids content of about 22% are obtained, corresponding to a polymer yield of 97%.

Example 8

Copolymer solutions with similar properties are obtained if the following monomer mixtures are copolymerised in the same manner as described in Example 7: (a) 40 parts of acrylic acid-methylpolyethylene glycol ester (molecular weight of the methylpolyethylene glycol=750), 5 parts of maleic acid and 5 parts of N-methylolacrylamide; (b) 40 parts of acrylic acid-methylpolyethylene glycol ester (molecular weight of the methylpolyethylene glycol=750), 5 parts of itaconic acid and 5 parts of N-methylolacrylamide; (c) 45 parts of acrylic acid-methylpolyethylene glycol ester (molecular weight of the methylpolyethlene glycol=750), 2.5 parts of acrylic acid and 2.5 parts of N-methylolacrylamide.

Example 9

34 parts of acrylic acid-methylpolyethlene glycol ester (molecular weight of the methylpolyethylene glycol=750), 2 parts of acrylic acid and 1 part of sodium laurylsulphonate are dissolved in 70.5 parts of water and 4.7 parts of isopropyl alcohol. This solution is adjusted to pH 6 with concentrated aqueous ammonia and 4 parts of N-methylolacrylamide are added. One-fifth of this solution is diluted with 53 parts of water, warmed to 60° C. whilst stirring and passing in nitrogen, and a solution of 0.5 part of sodium metabisulphite in 8 parts of water and a solution of 0.08 part of potassium peroxydisulphate in 1.6 parts of water is added. Thereafter the remaining monomer solution and, simultaneously and separately, a solution of 0.32 part of potassium peroxydisulphate in 6.4 parts of water, are introduced into the polymerisation vessel over the course of 3 hours. After completion of the addition the mixture is allowed to continue polymerising for 3 hours at 60° C. Isopropyl alcohol is distilled off in vacuo and about 167 parts of a solution having a pH-value of 5.9 and a solids content of 24.2% are obtained, corresponding to a polymer yield of 96%.

Example 10

32 parts of acrylic acid-methylpolyethylene glycol ester (molecular weight of the methylpolyethylene glycol=750), 4 parts of acrylic acid and 1 part of sodium laurylsulphonate are dissolved in 70 parts of water. This solution is adjusted to pH 6 with concentrated aqueous ammonia and 4 parts of N-methylolmethacrylamide-methyl ether are added. One-fifth of this solution is diluted with 53 parts of water, warmed to 60° whilst stirring and passing in nitrogen, and a solution of 0.5 part of sodium metabisulphite in 8 parts of water and a solution of 0.08 part of potassium peroxydisulphate in 1.6 parts of water is added. Thereafter the remaining monomer solution and, simultaneously and separately, a solution of 0.32 part of potassium peroxydisulphate in 6.4 parts of water are introduced into the polymerisation vessel over the course of 3 hours. After completion of the addition the mixture is allowed to continue polymerising for 3 hours.

About 178 parts of a solution having a pH-value of 6 and a solids content of 22.5% are obtained, corresponding to a polymer yield of 96%.

Example 11

The following are employed as monomers, according to the process described in Example 10: 32 parts of itaconic acid - di(methylpolyethylene glycol)ester (molecular weight of the methylpolyethylene glycol=750), 4 parts of acrylic acid and 4 parts of N-methylolacrylamine. A copolymer solution with similar properties to that described in Example 10 is obtained.

Example 12

Knitted polyester fabrics are impregnated with solutions or emulsions of the copolymers according to Examples 1 to 6. The concentration of the copolymer preparations is so adjusted that after squeezing out 5%, relative to the fibre weight, of the copolymer remain on the textile material. The copolymer preparations further contain 0.3% of magnesium chloride hexahydrate relative to the fibre weight.

The knitted fabric is dried at 80° C. and the copolymer is thereafter fixed for 5 minutes at 150° C. Knitted fabrics finished in this way show the following effects:

(a) Handle.—The handle is not noticeably affected.

(b) Hydrophilic character.—The hydrophilic character of treated knitted fabrics is greatly improved compared to untreated knitted fabrics. 2 cm. wide knitted fabric strips are dipped into an 0.05% strength fluorescein solution and after 10 minutes the level of rise, which represents a function of the hydrophilic character, is measured. In such a comparison, the following results were obtained:

Table I

| Knitted fabric strips treated with the preparation according to Example No.: | Level of rise, in cm. |
|---|---|
| Untreated | 7 |
| 1 | 12 |
| 2 | 12.5 |
| 3 | 13 |
| 4 | 12.5 |
| 5 | 12.5 |
| 6 | 12 |

(c) Antistatic finish.—A measure of a good antistatic finish is the reduction of the electrostatic charge and of the field decay half-life. Untreated and treated polyester knitted fabrics are washed three times for 20 minutes at 40° C. using a bath ratio of 1:30, in a bath containing 4 g./l. of a made-up detergent containing soap and sodium perborate. The knitted fabrics are then electrostatically charged once by rubbing against wool and once by rubbing against polyvinyl chloride. The measured values of the charge and of the field decay half-life are added and averaged. Table II gives the values in percent, relative to the untreated knitted fabric. Results of such a series of experiments:

TABLE II

| Knitted fabrics treated with preparation according to Example No. | Charge in percent | Field decay half-life in percent |
|---|---|---|
| Untreated | 100 | 100 |
| 1 | 30 | 10 |
| 2 | 50 | 5 |
| 3 | 20 | 5 |
| 4 | 50 | 5 |
| 5 | 20 | 10 |
| 6 | 40 | 20 |

(d) Ease of washing out of pigment dirt and lipophilic contact dirt.—The finished knitted fabrics, in contrast to untreated knitted fabrics, do not retain applied road dust after one washing carried out as under (c), and applied grease ("lanolin") is washed out.

Example 13

Knitted polyester fabrics are padded with solutions of the copolymers according to Examples 7 to 11. The concentration of the copolymer preparations is so adjusted that after squeezing out 5% of the copolymer, relative to the fibre weight, remain on the textile material. The copolymer preparations further contain 4 g./l. of magnesium chloride hexahydrate as the catalyst.

The knitted fabric is dried for 10 minutes at 80° C. and the copolymer is thereafter fixed for 4½ minutes at 150° C. Knitted fabrics which have been finished in this way show the following effects:

(a) Antistatic finish.—The electrostatic charge and field decay half-life are measured as described in Example 12.

Table III shows the values in percent, relative to untreated knitted fabrics.

TABLE III

| Knitted fabrics treated with preparation according to Example No. | Charge, in percent | | Field decay half-life in percent | |
|---|---|---|---|---|
| | After finishing | After washing 5 times | After finishing | After washing 5 times |
| Untreated | 100 | 100 | 100 | 100 |
| 7 | 0 | 55 | 0 | 5 |
| 8a | 0 | 55 | 0 | 5 |
| 8b | 0 | 55 | 0 | 5 |
| 9 | 0 | 55 | 0 | 10 |
| 10 | 0 | 25 | 0 | 5 |
| 11 | 0 | 20 | 0 | 5 |

(b) Ease of washing out dirt.—Lanolin wool fat, a mixture of lanolin with wool fat/vacuum cleaner dust, 4:1, and spent motor oil were used for soiling. The degree of dirt detachment is assessed according to the following scale: Mark 1—no dirt-detaching effect; 2—poor dirt-detaching effect; 3—moderate dirt-detaching effect; 4—good dirt-detaching effect; 5—very good dirt-detaching effect; < somewhat less good than; > somewhat better than.

The test specimens were washed 1 to 5 times as described under (a). The results of these experimental series are summarised in Table IV.

TABLE IV

| Knitted fabrics treated with preparation according to Example No. | Untreated | 7 | 8a | 8b | 9 | 10 | 11 |
|---|---|---|---|---|---|---|---|
| Lanolin: | | | | | | | |
| After finishing | 1 | 5 | 5 | 5 | 5 | 5 | 4 |
| Washed once | 1 | 5 | 5 | 5 | 5 | 5 | 5 |
| Washed 3 times | 1 | 5 | 5 | 5 | 5 | 5 | 5 |
| Washed 5 times | 1 | <5 | <5 | 4 | 4–5 | >3 | 3 |
| Lanolin/dust: | | | | | | | |
| After finishing | 2–3 | 4 | <5 | <5 | 5 | 4 | >4 |
| Washed once | 3 | 4–5 | 5 | 5 | 5 | 5 | 5 |
| Washed 3 times | 3–4 | 5 | 5 | 5 | <5 | <5 | <5 |
| Washed 5 times | 2–3 | 4 | <5 | 4 | 4 | 4 | 4–5 |
| Motor oil: | | | | | | | |
| After finishing | 1 | >2 | 4 | 4 | 3–4 | 3 | 3 |
| Washed once | 1 | >2 | 4 | <4 | 3–4 | 3 | 3 |
| Washed 3 times | 1 | 2–3 | 4 | 3–4 | 4 | 4 | 3–4 |
| Washed 5 times | 1 | 2–3 | 4–5 | 4 | 3–4 | 2–3 | 2–3 |

Example 14

Various woven and knitted fabrics are padded with a solution of the copolymer according to Example 4. The concentration of the copolymer solution is so adjusted that after squeezing out 5% of the copolymer, relative to the fibre weight, remain on the textile material. The woven fabrics and knitted fabrics are finished in this way according to two variants: (α) the copolymer solution contains 4 g./l. of magnesium chloride hexahydrate as the catalyst. It is dried normally and then condensed for 4½ minutes at 150° C.; (β) the copolymerised solution contains 2.5 g./l. of zirconium oxychloride as the catalyst. It is dried normally and then condensed for 30 seconds at 140° C. Textiles finished in this way show the following effects:

(a) Antistatic finish.—The electrostatic charge and the field decay half-life were measured as described in Example 12. Table V shows the values in percent, relative to untreated textile material.

TABLE V

| Variant | Treatment | Polyacrylonitrile knitted fabric | | Polyamide satin | | Polypropylene woven fabric | | Polyester/wool woven fabric | | Polyvinyl alcohol woven fabric | |
|---|---|---|---|---|---|---|---|---|---|---|---|
| | | AL | FZH | AL | FZH | AL | FZH | AL | FZH | AL | FZH |
| α | Untreated | 100 | 100 | 100 | 100 | 100 | 100 | 100 | 100 | 100 | 100 |
| | After finishing | 0 | 0 | 30 | 0 | 0 | 0 | 0 | 0 | 10 | 0 |
| | Washed 5 times | 35 | 5 | 95 | 35 | 30 | 0 | 50 | 10 | 15 | 5 |
| | Washed 10 times | 80 | 75 | 100 | 35 | 60 | 5 | ---- | ---- | 10 | 5 |
| β | Untreated | 100 | 100 | 100 | 100 | 100 | 100 | 100 | [1] 100 | 100 | 100 |
| | After finishing | 0 | 0 | 0 | 0 | 0 | 0 | 0 | 0 | 0 | 0 |
| | Washed 5 times | 30 | 5 | 75 | 10 | 15 | 0 | 0 | 0 | 5 | 5 |
| | Washed 10 times | 45 | 45 | 60 | 25 | 30 | 0 | ---- | ---- | 5 | 5 |

[1] Stability of the effect tested by cleaning 5 times in perchlorethylene.
AL=charge, FZH=field decay half-life.

(b) East of washing out lanolin.—Procedure and evaluation as described in Example 13.

TABLE VI

| Substrate | Treatment | After finishing | Washed once | Washed twice | Washed 3 times |
|---|---|---|---|---|---|
| Polyamide satin | Untreated | 3 | 5 | 3–4 | 3–4 |
| | Treated | 3–4 | 3–4 | 3–4 | 3–4 |
| Polyacrylonitrile knitted fabric | Untreated | 2 | 2 | 2 | ---- |
| | Treated | 5 | <5 | 5 | ---- |
| Polyester woven fabric | Untreated | 2 | 2 | 2 | ---- |
| | Treated | 4 | 4–5 | 4–5 | ---- |
| Polyester knitted fabric | Untreated | 1 | 1 | 1 | 1 |
| | Treated | 5 | 5 | 5 | 5 |

(c) East of washing out lanolin vacuum cleaner dust.—Procedure and evaluation as described in Example 13.

TABLE VII

| Substrate | Treatment | After finishing | Washed once | Washed twice | Washed 3 times |
|---|---|---|---|---|---|
| Polyamide woven fabric | Untreated | 1 | 1 | 1 | 1 |
| | Treated | 2–3 | 3 | 3 | 3 |
| Polyacrylonitrile woven fabric. | Untreated | 3–4 | 3 | 3 | 3 |
| | Treated | 4–5 | 4–5 | <5 | <5 |
| Polyacrylonitrile knitted fabric. | Untreated | 1 | 1 | 1–2 | 1–2 |
| | Treated | 3 | 3–4 | <3 | 3–4 |
| Polyester woven fabric | Untreated | 2 | 3 | <2 | 3–4 |
| | Treated | 4 | >4 | 4 | 4–5 |
| Polyester knitted fabric | Untreated | 1 | 1 | 1 | 1 |
| | Treated | 3 | 3 | 3 | 3 |

Example 15

A polyester knitted fabric is padded with a solution of the copolymer according to Example 4 in the same manner as described in Example 14. At the same time the acid-yielding catalysts and the condensation conditions were changed as follows: (a) 6 g./l. of $MgCl_2.6H_2O$/4½ minutes at 150° C.; (b) 3 g./l. of $AlCl_3$/4½ minutes at 150° C.; (c) 4 g./l. of $Zn(BF_4)_2$/4½ minutes at 150° C.; (d) 2.5 g./l. of $ZrOCl_2$/30 seconds at 150° C.

The electrostatic charge and the field decay half-life are measured as described in Example 12. Table VIII gives the values in percent, relative to untreated knitted fabric.

Example 16

A polyester-cotton mixed fabric is simultaneously given a creaseproof and anti-soiling finish by padding it with the following solution: 120 g./l. of 1,3-dimethylol-4,5-dihydroxy-2-imidazolidone, 80 g./l. of the copolymer according to Example 4, 15 g./l. of the sodium salt of the phthalic acid monooctadecyl ester and 12 g./l. of $MgCl_2 \cdot 6H_2O$.

The bath uptake is 60%. The fabric is dried for 2 minutes at 120° C. and subsequently condensation is effected for 4½ minutes at 150° C.

The polyester-cotton mixed woven fabric, in addition to receiving the creaseproof finish, also receives a finish which greatly improves the ease of washing out dirt and greatly reduces the reabsorption of dirt from the wash bath.

The 1,3-dimethylol-4,5-dihydroxy-2-imidazolidone may also be equally successfully replaced by other aminoplastic pre-condensates suitable for creaseproof finishing, such as for example methylolmelamines or dimethylolurea.

TABLE VIII

| Treatment | Electrostatic charge in percent | | | | Field decay half-life in percent | | | |
|---|---|---|---|---|---|---|---|---|
| | After finishing | Washed once | Washed 3 times | Washed 5 times | After finishing | Washed once | Washed 3 times | Washed 5 times |
| Untreated | 100 | 100 | 100 | 100 | 100 | 100 | 100 | 100 |
| (a) | 0 | 10 | 25 | 60 | 0 | 0 | 0 | 5 |
| (b) | 5 | 35 | 70 | 75 | 0 | 5 | 4 | 10 |
| (c) | 0 | 55 | 80 | 60 | 0 | 0 | 4 | 30 |
| (d) | 0 | 50 | 70 | 90 | 0 | 0 | 4 | 20 |

We claim:

1. Solid, random, linear copolymers cotaining (a) 80 to 90% of structural elements of an ester of an alkylpolyethylene glycol whose alkyl radical contains 1 to 3 carbon atoms and whose average molecular weight is 300 to 1000, and of an ethylenically unsaturated polymerisable carboxylic acid, (b) 5 to 10% of structural elements of an optionally etherified N-methylolamide of an ethylenically unsaturated polymerisable carboxylic acid and (c) 5 to 10% of structural elements of an ethylenically unsaturated polymerisable compound which contains at least one acid group which confers solubility in water.

2. Copolymers according to claim 1 containing (a) 80 to 90% of structural elements of an ester of an alkylpolyethylene glycol whose alkyl radical contains 1 to 3 carbon atoms and whose average molecular weight is 300 to 1000, and of an ethylenically unsaturated polymerisable carboxylic acid, (b) 5 to 10% of structural elements of a N-methylolamide of an ethylenically unsaturated polymerisable carboxylic acid and (c) 5 to 10% of structural elements of an ethylenically unsaturated polymerisable compound which contains at least one acid group which confers solubility in water.

3. Copolymers according to claim 1 containing (a) 80 to 90% of structural elements of an ester of a methylpolyethylene glycol whose average molecular weight is 350 to 750 and of an ethylenically unsaturated polymerisable carboxylic acid, (b) 5 to 10% of structural elements of a N-methylolamide of an ethylenically unsaturated polymerisable carboxylic acid and (c) 5 to 10% of structural elements of an ethylenically unsaturated polymerisable compound which contains at least one acid group which confers solubility in water.

4. Copolymers according to claim 1 containing (a) 80 to 90% of structural elements of an ester of a methylpolyethylene glycol whose average molecular weight is 350 to 750, and of acrylic or methacrylic acid, (b) 5 to 10% of structural elements of a N-methylolamide of an ethylenically unsaturated polymerisable carboxylic acid and (c) 5 to 10% of structural elements of an ethylenically unsaturated polymerisable compound which contains at least one acid group which confers solubility in water.

5. Copolymers according to claim 1 containing (a) 80 to 90% of structural elements of an ester of an alkylpolyethylene glycol whose alkyl radical contains 1 to 3 carbon atoms and whose average molecular weight is 300 to 1000, and of an ethylenically unsaturated polymerisable carboxylic acid, (b) 5 to 10% of structural elements of a N-methylolamide of acrylic or methacrylic acid and (c) 5 to 10% of structural elements of an ethylenically unsaturated polymerisable compound which contains at least one acid group which confers solubility in water.

6. Copolymers according to claim 1 containing (a) 80 to 90% of structural elements of an ester of an alkylpolyethylene glycol whose alkyl radical contains 1 to 3 carbon atoms and whose average molecular weight is 300 to 1000, and of an ethylenically unsaturated polymerisable carboxylic acid, (b) 5 to 10% of structural elements of a N-methylolamide of an ethylenically unsaturated polymerisable carboxylic acid and (c) 5 to 10% of structural elements of an ethylenically unsaturated polymerisable carboxylic or sulfonic acid.

7. Copolymers according to claim 1 containing (a) 80 to 90% of structural elements of an ester of an alkylpolyethylene glycol whose alkyl radical contains 1 to 3 carbon atoms and whose average molecular weight is 300 to 1000, and of an ethylenically unsaturated polymerisable carboxylic acid, (b) 5 to 10% of structural elements of a N-methylolamide of an ethylenically unsaturated polymerisable carboxylic acid and (c) 5 to 10% of structural elements of a member selected from the group consisting of acrylic acid, methacrylic acid, vinylsulfonic acid, hexahydro-1,3-diacryloyl-5-sulfopropionyl-s-triazine and hexahydro-1-acryloyl-3,5-disulfopropionyl-s-triazine.

8. Copolymers according to claim 1 containing (a) 80 to 90% of structural elements of an ester of a methylpolyethylene glycol whose average molecular weight is 750, and of acrylic or methacrylic acid, (b) 5 to 10% of structural elements of N-methylolacrylamide and (c) 5 to 10% of structural elements of acrylic or methacrylic acid.

9. Copolymers according to claim 1 containing (a) 80 to 90% of structural elements of an ester of a methylpolyethylene glycol whose average molecular weight is 750 and of acrylic acid, (b) 5 to 10% of structural elements of N-methylolacrylamide and (c) 5 to 10% of structural elements of acrylic acid.

10. Copolymers according to claim 1 containing (a) 80% structural elements of an ester of a methylpolyethylene glycol whose average molecular weight is 750 and of acrylic acid, (b) 10% of structural elements of N-methylolacrylamide and (c) 10% of structural elements of acrylic acid.

References Cited

UNITED STATES PATENTS 2,892,820 6/1959 Stewart et al. -------- 260—80.5

JOSEPH L. SCHOFER, Primary Examiner
STANFORD M. LEVIN, Assistant Examiner

U.S. Cl. X.R.

117—138, 139, 143; 260—75, 79, 80, 88, 89, 91, 93